United States Patent
Maxwell

(12) 
(10) Patent No.: US 6,195,643 B1
(45) Date of Patent: Feb. 27, 2001

(54) EVALUATION AND DECISION MAKING SYSTEMS

(75) Inventor: Alan A Maxwell, Christchurch (NZ)

(73) Assignee: Baldwin Shelston Waters, Christchurch (NZ)

( * ) Notice: Subject to any disclaimer, the term of this patent is extended or adjusted under 35 U.S.C. 154(b) by 0 days.

(21) Appl. No.: 09/370,745

(22) Filed: Aug. 9, 1999

Related U.S. Application Data

(63) Continuation of application No. 08/825,941, filed on Apr. 1, 1997, now abandoned.

(30) Foreign Application Priority Data

Apr. 2, 1996 (NZ) ...................................... 286313

(51) Int. Cl.[7] .................................................. G06F 17/60
(52) U.S. Cl. ............................................................. 705/10
(58) Field of Search .................................. 705/10, 26, 1, 705/7; 706/47, 13

(56) References Cited

U.S. PATENT DOCUMENTS

| | | | |
|---|---|---|---|
| 4,843,567 | * 6/1989 | Mukherjee et al. | 706/46 |
| 4,992,940 | * 2/1991 | Dworkin | 705/26 |
| 5,122,952 | * 6/1992 | Minkus | 705/26 |
| 5,182,793 | * 1/1993 | Alexander et al. | 706/13 |
| 5,717,865 | * 2/1998 | Stratmann | 705/10 |

FOREIGN PATENT DOCUMENTS

97/09666  3/1997 (WO).

OTHER PUBLICATIONS

Vincze, Julian W., "Expert Choice," Decision Line, pp. 10–12, Mar. 1990.*

Saaty, Thomas L., Decision Making for Leaders, RWS Publications, pp. 27–33, 1988.*

* cited by examiner

*Primary Examiner*—Eric W. Stamber
*Assistant Examiner*—Susanna Meinecke-Diaz
(74) *Attorney, Agent, or Firm*—Morrison & Foerster, LLP

(57) ABSTRACT

A decision making system is described whereby a method of performing a detailed level evaluation of one or more products or articles based on a decision makers response to one or more questions relating to the decision makers requirements is described. The method includes the decision maker responding to the question relating to the decision makers functional requirement or requirements talking into account a predefined result type. The response is compared with a product result where the product result reflects a particular functional capability of the article or product in relation to the particular question. This produces an evaluation ratio or series of evaluation ratios which are statistically analysed to determine how well the product or article meets the decision makers requirements. The method is particularly suitable for analysis of software packages such as accounting packages and the like and provides a way by which a user may determine, at a highly detailed level, the suitability of various packages to the users requirements.

12 Claims, 5 Drawing Sheets

FIG. 4

| FUNCTIONAL AREA | RESPONSE RESULT | PACKAGE A | PACKAGE B | PACKAGE C | PACKAGE D |
|---|---|---|---|---|---|
| IS S/W DEVELOPED IN NZ AND/OR FOR NZ? | 9 Ma | 9 M 100 | 9 M 100 | 9 M 100 | 9 M 100 |
| USER DEFINED MACRO FACILITY? | 9 Ma | 9 M 100 | 0 G 0 | 0 D 0 | 9 M 100 |
| APP USE EVENT DRIVEN INTERFACE THAT SUPPORTS MOUSE? | 0 N | 9 M 100 | 0 M 100 | 0 M 100 | 9 W 900 |
| SYSTEM SUPPORT USER DEFINED ACCOUNTING PERIODS? | 0 N | 9 W 900 | 9 M 100 | 5 W 500 | 9W 100* |
| APPLICATION HANDLE MULTIPLE CURRENCIES? | 0 N | 9 W 900 | 9 W 900 | 9 W 900 | 9 W 900 |
| SOFTWARE AN INTEGRATED MODULE BASED SYSTEM? | 0 N | 9 W 900 | 9 W 900 | 9 W 900 | 0 D 0 |
| BACKUP FUNCTIONALITY INTEGRATED INTO S/W? | 9 Ma | 9 M 100 | 0 D 0 | 9 G 90 | 9 M 100 |
| IMPORT OF DATA FOR SYSTEM SETUP? | 9 Ma | 9 M 100 | 9 M 100 | 9 M 100 | 9 W 900 |
| IMPORT TRANSACTION DATA DURING SYSTEM OPERATION? | 0 N | 9 W 900 | 9 W 900 | 9 W 900 | 9 M 100 |
| DATA EXPORT SUPPORTED? | 9 Ma | 9 M 100 | 9 M 100 | 9 M 100 | 9 M 100 |
| REPORT O/P TO PRINTER? | 9 Ma | 9 M 100 | 9 M 100 | 9 M 100 | 9 M 100 |
| REPORT O/P TO SCREEN? | 9 Ma | 9 M 150 | 9 M 100 | 9 M 100 | 9 M 100 |
| REPORT O/P TO FILE? | 9 U | 9 M 100 | 9 M 100 | 9 M 100 | 9 M 100 |
| USER CUSTIMIZATION OF REPORTS? | 9 Ma | 0 D 0 | 0 D 0 | 9 M 100 | 9 M 100 |
| ENTRY OF SELECTION CRITERIA WHEN REPORTING? | 9 Ma | 9 W 900 | 9 W 900 | 9 W 900 | 9 W 900 |
| DATA ENTRY IMMEDIATELY UPDATE FILES? | 0 N | 9 W 900 | 9 M 100 | 5 W 500 | 9 M 100 |
| DATA ENTRY BATCHED FOR LATER POSTING TO RELEVANT FILES? | 9 Ma | 9 M 100 | 9 M 100 | 9 M 100 | 9 W 900 |
| NO CHANGE/DELETION IN TRANSACTION ONCE POSTED? | 9 Ma | 9 G 67 | 9 M 100 | 9 M 100 | 9 M 100 |
| USER SECURITY? | 9 Ma | | | | |
|  | | NO MET/NOT MET | NO MET/NOT MET | NO MET/NOT MET | NO MET/NOT MET |
|  | | 10/2 | 9/3 | 10/2 | 11/1 |
|  | | 1/0 | 1/0 | 1/0 | 1/0 |
|  | | 6/0 | 6/0 | 6/0 | 6/0 |
|  | | 17/2 | 16/3 | 17/2 | 18/1 |
|  | | 89% MET | 84% MET | 89% MET | 95% MET |

| | |
|---|---|
| MANDATORY | 12 |
| USEFUL | 1 |
| DESIRABLE | 0 |
| NOT REQUIRED | 6 |
| | 19 |

N = NOT REQUIRED
Ma = MANDATORY
U = USEFUL
D = DESIRABLE

W = WELL EXCEEDS
M = MEETS
Ma = MARGINAL
D = DEFICIENT

EVALUATION AND DECISION MAKING SYSTEMS

This application is a continuation of U.S. patent application Ser. No. 08/825,941, filed Apr. 1, 1997, now abandoned.

TECHNICAL FIELD

The present invention relates to a method and software application for assisting in, or performing and providing information used in decision making functions.

More particularly, although not exclusively, the present invention relates to a software application which is particularly suited for evaluating the suitability of other software applications to a situation, in response to detailed criteria supplied by a user or users (a decision maker).

It is to be understood that the present invention is not limited to evaluation of software packages. The present method and software application could be used for evaluating or selecting staff, products, market strategies. It may find application in situations where a decision must be made in response to how well one or more criteria are satisfied, where those criteria have their own level of preference.

It is also to be understood that the present software application may be used in an inverse manner wherein a supplier focused analysis can be performed.

BACKGROUND TO THE INVENTION

Formal decision making processes and strategies are well known at varying levels of complexity and utility. Early frameworks imposed on decision making processes have revolved around statistical techniques and the mathematical analysis of decision making processes with hierarchies imposed upon them. However, the detailed analysis of a decision makers requirements have been traditionally based upon taking averages of numerical indications of preferences or suitability.

Such decision making techniques generally rely on positive/negative responses from a decision maker whereby the statistical level of satisfaction is based on a relatively coarse level of querying and results in an averaged figure which allows the ranking of the available options.

Other techniques known in the art are those where a decision maker result and a product result are, for each question, multiplied together to produce a weighted value that is added to the weighted values from the other questions. This produces an overall score for the product. The higher the overall score, the better the product. This approach can mask or obscure underlying information and represents a "smoothing" of the query process and thus the interpretative value of the results are reduced.

Accordingly, it is an object of the invention to provide a decision making process and application which allows for a more detailed analysis of the decision makers query process and associated levels of satisfaction than the prior art, as well as providing a method and software application which overcomes or at least mitigates the abovementioned disadvantages or at least provides the public with a useful choice.

Further objects of the invention will become apparent from the following description.

DISCLOSURE OF THE INVENTION

According to one aspect of the invention there is provided in a decision making system, a method of performing a high level evaluation of one or more products or articles based on a decision maker's response to one or more questions relating to that product or article said method comprising:

(1) the decision maker specifying one or more functional requirements;

(2) matching the functional requirements with corresponding functional requirements supported by a product or article, optionally matching the functional requirements with the corresponding functional requirements supported by one or more modules, wherein said modules may be a component of the product or article; and (3) providing an output describing which products or articles, and optionally which modules associated with the products or articles, best exhibit the functional features required by the decision maker.

Optionally, the high level evaluation may further include providing costing and cost justification information relating to the decision makers functional requirements.

In another aspect of the invention there is provided in a decision making system, a method of performing a detailed level evaluation of one or more products or articles based on a decision maker's response to one or more questions relating to the decision maker's functional requirements comprising:

(1) the decision maker providing a response result in response to a question relating to the decision makers functional requirement(s), taking into account a predefined a result type;

(2) the response result is compared with a product result, wherein the product result is a data element reflecting the functional capability of the article or product in relation to the particular question, thereby producing an evaluation ratio and optionally the evaluation ratio may be associated with a significance level reflecting how well the product result meets the decision maker's corresponding functional requirement;

(3) optionally the system calculates evaluation ratios so as to include information relating to whether the functional requirement is provided by one or more modules;

(4) the decision maker providing a detailed requirement, the detailed requirement reflecting how necessary the functional requirement is to the decision maker's needs; and (5) providing an output setting out, for a particular functional requirement, the number of detailed requirements as a function of significance level.

Preferably the evaluation ratio is the product result divided by the response result or the response result divided by the product result, the choice being made so that a higher evaluation ratio corresponds to a greater degree of suitability to the decision makers functional requirements.

Preferably the output is expressed as the percentage number of decision maker detailed requirements which have been met or exceeded along with percentage information relating to categories of decision maker detailed requirements which are either met or not met.

In a further aspect, the articles or products may incorporate modules which exhibit functionality which may or may not meet the decision maker functional requirements, said modules features being used in order to determine the evaluation cut off ratios wherein the output information includes reference to those modules which meet the decision makers criteria.

In a preferred embodiment the evaluation ratios are levels of significance expressed as qualitative data elements known as significance levels relating to the degree to which a particular product is deficient, marginal, meets or exceeds the response result for a particular question and/or related functional requirement.

Preferably the detailed requirement reflects how critical or necessary it is that the particular functional requirement be provided or met by the product or article, more particularly the detailed requirement is classified according to the categories: not required, desirable, useful and mandatory.

Preferably evaluation ratios between 1.0 and 2.0 are identified with the product result meeting the decision maker functional requirement, between 0.0 and 0.8 the product result being deficient, between 0.8 and 1.0 the product result being marginal, and above 2.0 the product result exceeding substantially the decision makers functional requirements.

Preferably the output provides information relating to any modules which may provide the functional requirements of the decision maker and indicate how and in what module the functional requirements are provided.

Preferably the output also includes a means by which the cost of the article or product may be gauged as a function of meeting or exceeding the decision makers functional requirements.

Alternatively, the output may provide the cost of the product or articles, including any modules which may be required to meet or exceed the decision makers functional requirements.

According to yet another aspect, the present invention provides for a decision making system including the steps of performing a high level functional analysis and/or detailed level functional analysis prior to providing an output to a decision maker.

In a further aspect, the result type may be an evaluation, a maximum and/or minimum or similar data element describing the type of information that is embodied by the response result.

Further aspects of the invention will become apparent from the following description which is given by way of example only and with reference to the accompanying drawings:

BRIEF DESCRIPTION OF THE DRAWINGS

FIG. 4 illustrates a particular example of how a tabulated output may be provided.

The present invention may be implemented on a number of platforms, running a variety of operating systems and using a variety of interfaces. The particular example discussed below, may be run in a Windows' environment on a PC.

The following description will be given using the example of evaluating a number of accounting packages. However, it is to be understood that the present method and software application may be used to evaluate products, applications, services and people. The example provide herein is intended to be illustrative in that the questions to which a decision maker replies are directed towards attributes and functional features provided by the different accounting packages. However, the questions could be readily adapted to the attributes required of an employee, the features required in a product, or any other criteria or basis upon which a decision is to made.

Similarly, it will be clear to one skilled in the art that an inverse process may be performed whereby a supplier focused process is carried out. To this end, questions would be framed in relation to a particular product. For example: what price a client would expect to pay for a product? what sort of packaging is important? and when and where would the product be available? The output would be expressed as a percentage or proportion of customers whose expectations are met by the particular product and can therefore outline deficiencies and areas in which the product may be changed to intercept or maximise the cross-section of target consumers for that product.

However, the following description will be in the context of the evaluation of a number of accounting packages which are to be evaluated on the basis of particular functional feature which is required by a decision maker.

Figure 1:
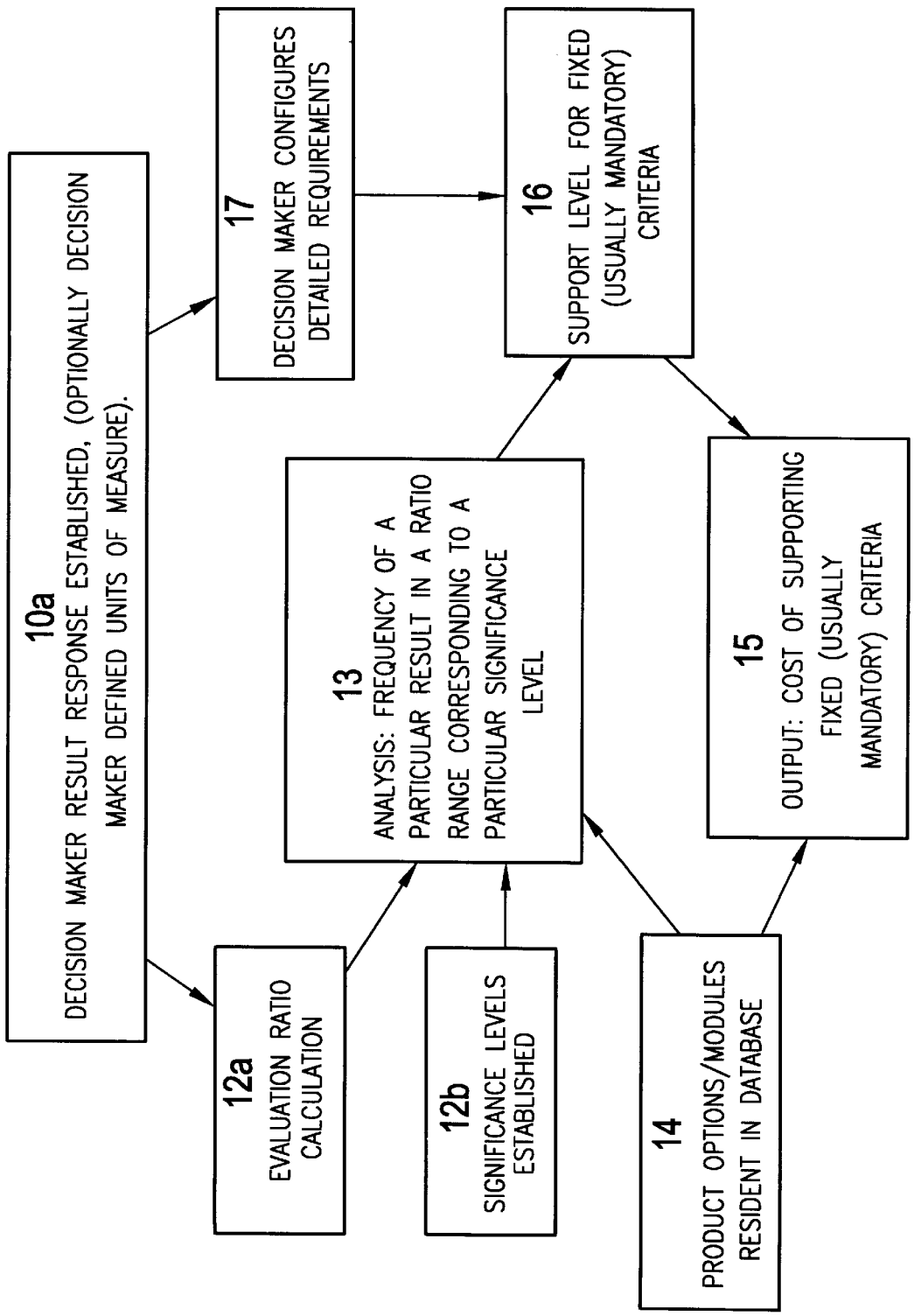
FIG. 1 shows the steps of analysing a product with corresponding information flow in relation to a particular functional attribute or requirement.

Referring to FIG. 1, a general outline of the process performed by the present software and the flow of information in that process is shown.

It will be clear to one skilled in the art that the following description is not intended to be exhaustive of the entire software package. There are many features of software applications which are to be considered within the purview of a skilled programmer. For example, building the interface between the analysis component of the application and the user interface, as well as various database, file management and output components of the software. Such aspects will be discussed only where relevant to the inventive method and software application.

The example given below assumes that information relating to the capabilities of the prospective products has been collated. The nature of the products in the product database will define the context and content of the questions to which the decision maker responds.

A decision maker will typically be presented with a range of questions appropriate to the software package or packages (the "products" or "articles" referred to above) with which the decision makers functional requirements are associated. To this end, in the context of an accounting package, typical functional attributes might be which operating systems are supported by the package, the hardware requirements of the particular package, system support, multi-user requirements, numbers of users supported, cash book requirements and the like.

For brevity, only one question will be discussed in the following example. This content and form of question is not intended to be limiting and, as will be clear, any combination of suitable questions relating to the functional attributes of an application package (or product, service etc) will be appropriate. Clearly the questions are determined beforehand and this will be done in the light of a particular decision makers requirements and the context of the decision itself.

In this example, a decision maker is presented with the choice of packages A, B, and C. The question to which the decision maker is to respond to is that of how many customers does the package support. This question reflects the decision makers functional requirement. FIG. 1 illustrates the overall process implemented by the novel software.

Figure 2:
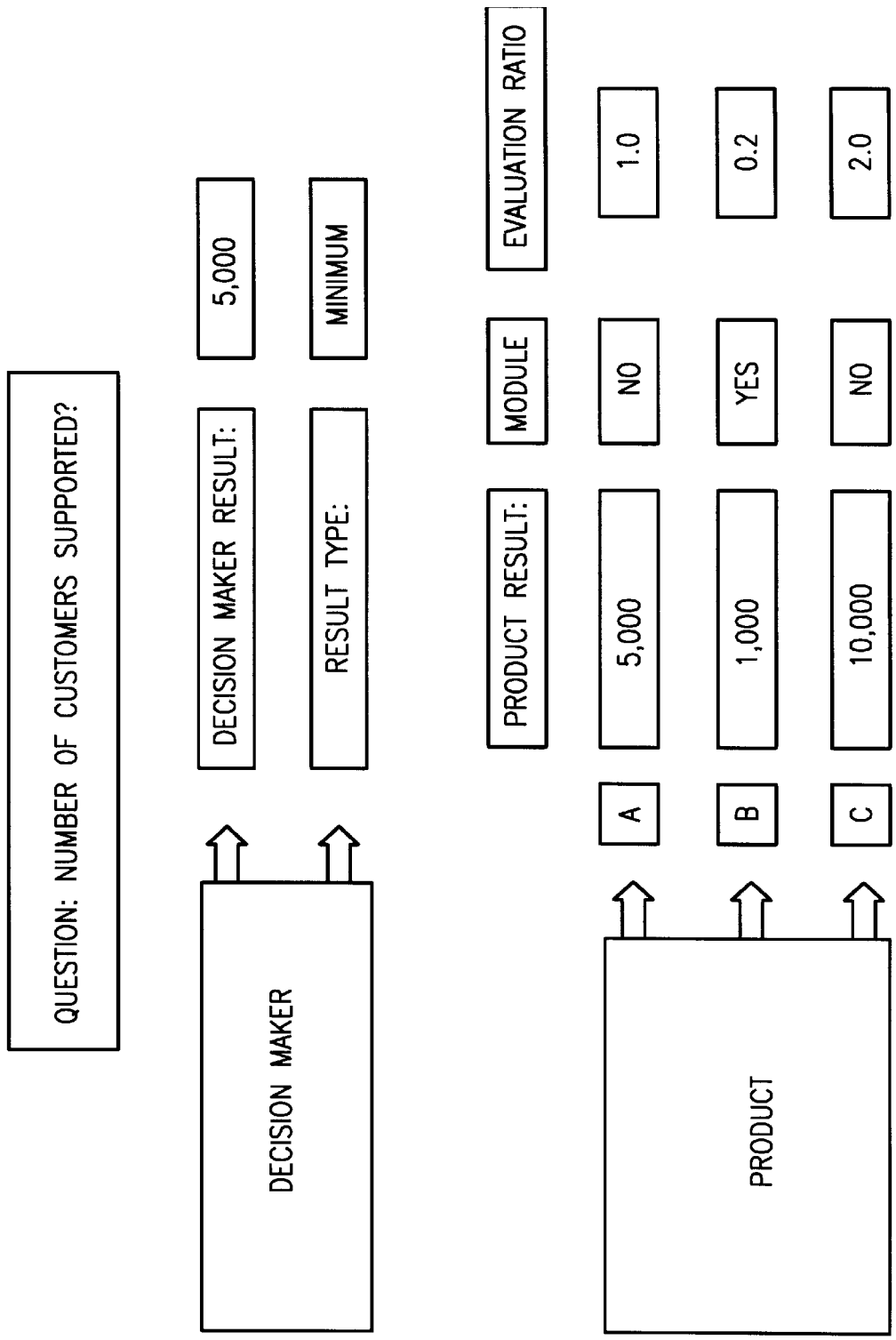
FIG. 2 illustrates an example, in tabular form, of the calculation of evaluation ratios for a single question.

Once the question is framed, the decision maker, at 10a, inputs a "decision maker response result". Optionally (and more usually) the decision maker will also define the units of measure appropriate for the decision maker response result. In the particular example (see FIG. 2) the decision maker response result is 5,000. That is—the number of customers which the application software must support. The decision maker, in this example, also inputs a result type. Here, the decision maker specifies that 5,000 represents the minimum number of customers which must be supported by the product.

This decision maker response result and result type is compared with a corresponding "product result" for package A, B and C. The corresponding capabilities are that package A supports 5,000 users, B supports 1,000 users and C supports 10,000 users. In this case the fact that the result type is a minimum places a lower limit on the evaluation ratio which may be reflected in the significance level of that figure.

Evaluation ratios are calculated (box 12a in FIG. 1) by dividing the decision makers response result by the product result. This leads to evaluation ratios of 1.0 (Product A: 5,000/5,000), 0.2 (Product B: 1,000/5,000) and 2.0 (Product C: 10,000/5,000). The evaluation ratio is a measure of the comparison between the decision makers requirements and the capability of the particular feature offered by the product.

If the functional requirement is provided by a module, this can be taken into account at step 14 in FIG. 1 whereby additional costing information is provided.

Associated with the evaluation ratios are significance levels (box 126 in FIG. 1). This data element indicates the qualitative capability of the package in meeting the decision makers response result.

Figure 3:
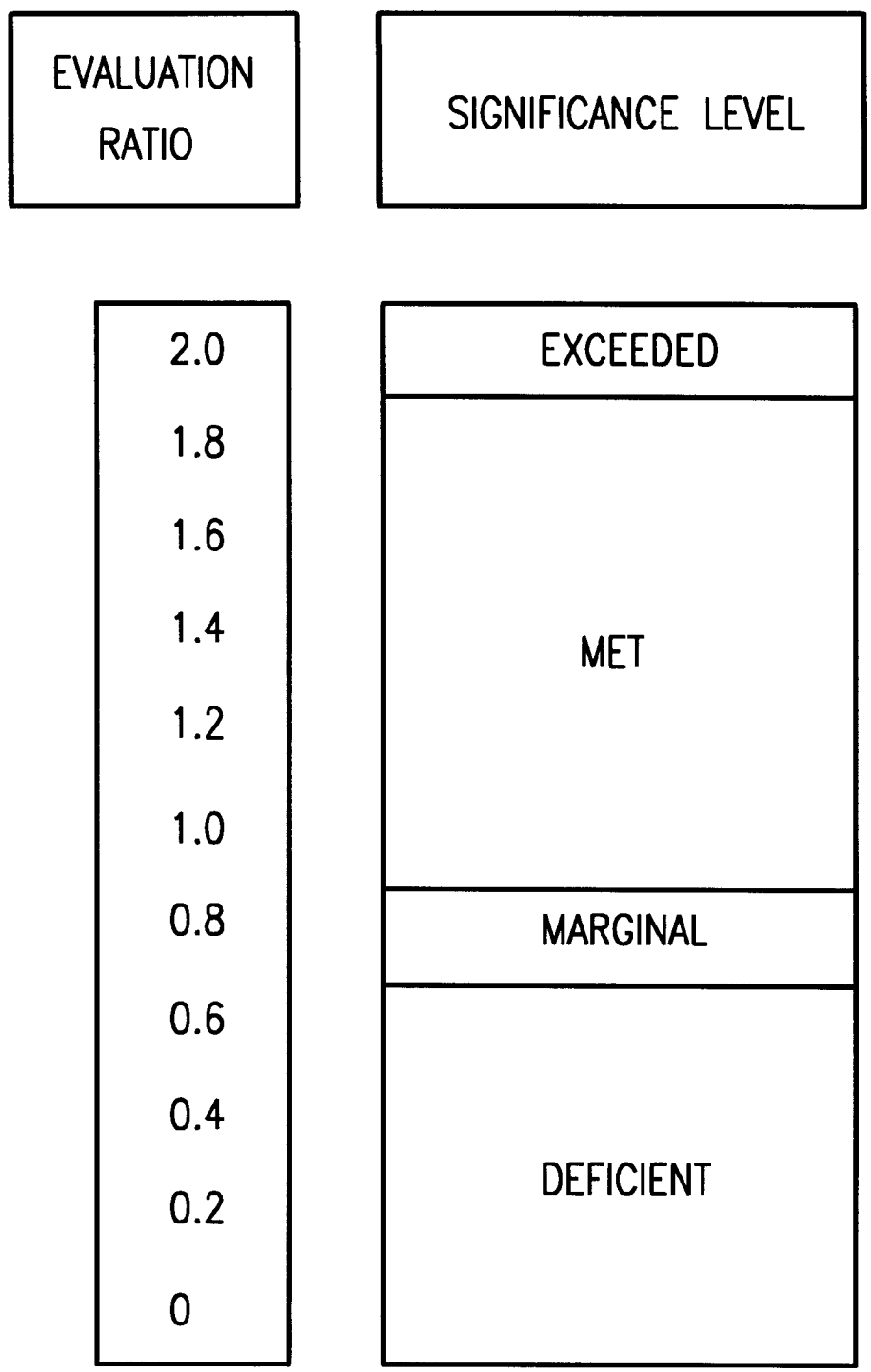
FIG. 3 illustrates, in tabular form, the correlation between the evaluation ratios and the significance levels.

Referring to FIG. 3, the significance levels are subdivided as follows: deficient corresponds to an evaluation ratio of between 0–0.08. Marginal corresponds to an evaluation ratio between 0.8 and <1.0; and an evaluation ratio of 1.0 indicates that the decision makers functional requirements have been met; and evaluation ratios above 1.0 indicate that the decision makers functional requirements have been exceeded. Clearly, the subdivision of the evaluation ratios may be arranged depending on the users requirements. However, the division set out above has been found to be appropriate.

At the initial query stage, a decision maker specifies the decision makers detailed requirements in respect of this particular functional feature (box 17 in FIG. 1). In this case, the decision maker indicates whether this feature is mandatory, useful, desirable or not required. Thus, there is provided a finer level of discrimination between functional features which are met or exceeded and those which are present but are relatively unimportant. In this example, the decision maker indicates that this functional requirement (ie that a number of users supported by the package be at least 5,000) is mandatory. Thus, the system will record that package A meets a mandatory requirement, Package B is deficient in respect of a mandatory requirement and Package C exceeds a mandatory requirement. Thus it will be clear that in cases where the user specifies that a feature would be preferable but not vital, a lesser weighting can be given to a package which happens to meet that requirement. This is clearly an advantage as there may be some packages or combinations of packages and modules which, although appearing to exceed the requirements in relation to a large number of functional features, these functional features may not be particularly important to the decision maker and should therefore be given less weight in the decision making process.

A frequency distribution describing which functional areas is met or exceed is provided. An example is shown in FIG. 4. In this example a series of 19 questions relating to a decision makers functional requirements have been answered. In this case, the questions are framed to invoke affirmative/negative responses. A 9 corresponds to a yes, and a 0 to a no. The column labelled response result gives the response results and significance levels for the 19 questions. The key correlating the significance levels is given in the figure. The columns headed Package A etc give the product responses for each package for each question Here the capability of the package in meeting the detailed requirement is given in a range from 0 to 9. The product response is shown with the evaluation result for that question. That it—whether the functional requirement is met, well exceeded, marginal or deficient. Next to each product result is given the evaluation ratio for that question. These are expressed as a percentage with 100 corresponding to an evaluation ratio of 100% (ie: meeting the functional requirement) and 900% indicating that the requirement has been well exceeded. The cost justification analysis of particular product includes the frequency distribution costs combined with the multiuser functionality cost.

The sub-table at the lower part of the figure gives the results expressed as the number of requirements met/not met. On the left are the decision makers detailed requirements with the number of question classified accordingly given to their right. The * indicates that the particular functional feature is provided in a nonstandard module, and this is taken into account in giving costing information for that package. An example of a nonstandard module might be the provision of special report writing functionality.

Figure 5:
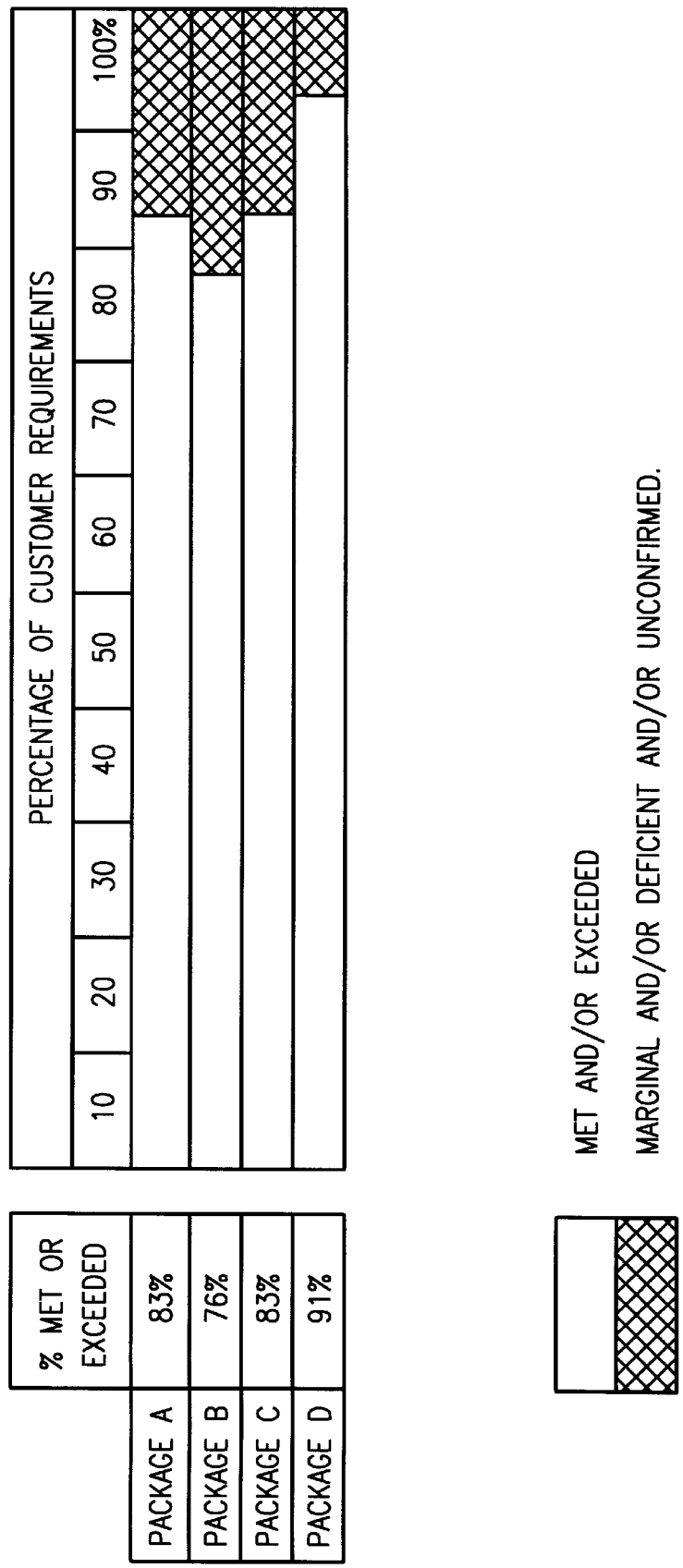
FIG. 5 illustrates a sample output showing the level package support for mandatory requirements.

From the sample output, package D meets 92% of the mandatory requirements and 95% of the total requirements. This is shown again in FIG. 5 where the percentage of customer requirements met or exceeded is shown in bargraph form. The key is provided at the lower part of the figure. Clearly the bargraph could be farther subdivided to show the fine detail of what percentage or the functional requirements are met, are deficient etc.

Sample data only are given and are not associated with the particular A,B and C example discussed above.

The present invention also provides utility in that the product database will record what features are provided by the core part of the accounting package and which features are provided by additional modules. Additional modules usually are an added expense. Therefore, it is desirable that a decision maker be informed whether a particular set of feature which be or she has specified as mandatory are provided. For two packages, they may be in one by the core of the package and in the other by a number of modules.

The module requirement can significantly effect the ultimate cost of satisfying the decision makers requirements. Therefore, a further level of refinement in the decision making process is provided.

The "output information" is coupled with the product database in order to provide an indication of the cost of meeting the decision makers functional requirements. This is represented by the flow of information from Box 14 in FIG. 1 to box 13 resulting in the steps of boxes 16 and 15. A large amount of detailed information is accessible and this can be shown in graphical or tabular form whereby a user may select a product which, for example, meets or exceeds a particular percentage of the mandatory requirements (as opposed to meeting or exceeding all or some of the general requirements). Alternatively, the decision maker may look at various functional attributes which are useful and/or mandatory which the application package meets or exceeds.

Alternatively, the output information may be presented graphically showing the statistical percentage of mandatory (or otherwise specified fictional attributes which are met or exceeded by a particular package). This can be broken down into functional areas or groups of functional areas depending on the features which are required or provided by the package.

Clearly, the present invention is not only applicable to evaluating accounting packages for software. The present technique could equally be applied to the selection of an employee for a particular position. Here, the questions will be framed around the desired functional features (more appropriately referred to as "attributes" in this case) to be provided by the person. Potential applicants may respond to these questions whereupon the output will illustrate which of the important features are met or exceeded for a particular applicant. By analogy to the module paradigm, if extra training is required in order to make an applicant suitable for a job, such factors can be taken into account and indicated in the final cost of employing the person.

Thus it can be seen that the present technique provides for a method of making a decision and obtaining information about a product, service, article or similar situation. The technique is appropriate where a decision must be made based on a number of factors and the output information provide varying levels of complexity and information. It is considered that the ratio technique is superior to a simple averaging and weighting technique as averaging techniques do not take into account the fact that a particular feature may be considerably less important to a decision maker than another feature. By looking at the frequency distribution of the particularly desired functional attributes and, for a particular product, their evaluation ratios, an indication can be obtained as to which particular product meets the decision makers most important requirements and the cost associated therewith.

As noted above the inverse of this process may be performed. This process would be directed towards a particular decision maker. That is, for a particular product, questions may be framed so that the particular functional features provided by the product which are of greatest importance may be ascertained. This will clearly be useful in situations where market analysis has to be done for a particular product prior to the release of the product and/or development of the product.

The present decision making application is not restricted to the abovementioned platform or interface. It could readily be imnplemented on any number of other platforms as may be available at the present, running a variety of operating systems and user interfaces.

Where in the foregoing description reference has been made to elements or integers having known equivalents these are included as if they were individually set forth.

Although the invention has been described by way of example and with reference to a particular embodiment thereof, it is to be understood that modifications and/or improvements may be made without departing from the scope of the appended claims. This is particularly so in cases where the present invention may be added as a module or internal functional component of an integrated software program or suite of software applications.

What is claimed is:

1. In a decision making system, a method of performing a detailed level evaluation of one or more products or articles based on a decision maker's response to one or more questions relating to the decision maker's functional requirements comprising:

(1) the decision maker providing a response result representing how important a particular detailed requirement is to that decision maker in response to a question relating to the decision makers functional requirement (s), taking into account a predefined result type;

(2) the response result is compared with a product result, wherein the product result is a data element reflecting the functional capability of the article or product in relation to the detailed requirement, thereby producing an evaluation ratio and optionally the evaluation ratio may be associated with a significance level reflecting how well the product result meets the decision maker's corresponding functional requirement;

(3) calculating evaluation ratios so as to include information relating to whether the functional requirement is provided by one or more modules; and (4) providing an output setting for a particular product or article and a particular detailed requirement, the number of proportion of functional requirements within said particular detailed requirement as a function of significance level, wherein the evaluation ratio is the product result divided by the response result or the response result divided by the product result, the choice being made so that a higher evaluation ratio corresponds to a greater degree of suitability to the decision maker's functional requirements.

2. A method as claimed in claim 1 wherein the output is expressed as the percentage number of decision maker detailed requirements which have been met or exceeded along with percentage information relating to categories of decision maker detailed requirements which are either met or not met.

3. A method as claimed in claim 1 wherein the articles or products incorporate modules which exhibit functionality which may or may not meet the decision maker functional requirements, said modules features being used in order to determine the evaluation cut off ratios wherein the output information includes reference to those modules which meet the decision maker's criteria.

4. A method as claimed in claim 1 wherein the evaluation ratios are levels of significance expressed as qualitative data elements known as significance levels relating to the degree to which a particular product is deficient, marginal, meets or exceeds the response result for a particular question and/or related functional requirement.

5. A method as claimed in claim 1 wherein the detailed requirement reflects how necessary it is that the particular functional requirement be provided or met by the product or article, more particularly the detailed requirement is classified according to the categories: not required, desirable, useful and mandatory in the context of the decision maker.

6. A method as claimed in claim 1 wherein evaluation ratios between 1.0 and 2.0 are identified with the product result meeting the decision maker functional requirement, between 0.0 and 0.8 the product result being deficient, between 0.8 and 1.0 the product result being marginal, and above 2.0 the product result exceeding substantially the decision maker's functional requirements.

7. A method as claimed in claim 1 wherein the output provides information relating to any modules which may provide the functional requirements of the decision maker and indicate how and in what module the functional requirements are provided.

8. A method as claimed in claim 1 wherein the output also includes a means by which the cost of the article or product may be gauged as a function of meeting or exceeding the decision maker's functional requirements.

9. A method as claimed in claim 1 wherein the output may provide the cost of the product or articles, including any modules which may be required to meet or exceed the decision makers functional requirements.

10. A method as claimed in claim 1 including the steps of performing a high level functional analysis and/or detailed level functional analysis prior to providing the output to the decision maker.

11. A method as claimed in claim 1 wherein, the result type may be an evaluation, a maximum and/or minimum or similar data element describing the type of information that is embodied by the response result.

12. A computer readable medium containing a computer program with instructions to direct a computer to perform the steps of the method comprising:

(1) the decision maker providing a response result representing how important a particular detailed requirement is to that decision maker in response to a question relating to the decision maker's functional requirement (s), taking into account a predefined result type;

(2) the response result is compared with a product result, wherein the product result is a data element reflecting the functional capability of the article or product in relation to the detailed requirement thereby producing an evaluation ratio and optionally the evaluation ratio may be associated with a significance level reflecting how well the product result meets the decision maker's corresponding functional requirement;

(3) calculating evaluation ratios so as to include information relating to whether the functional requirement is provided by one or more modules; and (4) providing an output setting for a particular product or article and a particular detailed requirement, the number of proportion of functional requirements within said particular detailed requirement as a function of significance level wherein the evaluation ratio is the product result divided by the response result or the response result divided by the product result, the choice being made so that a hither evaluation ratio corresponds to a greater degree of suitability to the decision maker's functional requirements.

* * * * *

UNITED STATES PATENT AND TRADEMARK OFFICE
CERTIFICATE OF CORRECTION

PATENT NO.     : 6,195,643 B1
DATED          : February 27, 2001
INVENTOR(S)    : Alan A. Maxwell It is certified that error appears in the above-identified patent and that said Letters Patent is hereby corrected as shown below:

Title page,
Item [73], delete "Assignee: Baldwin Shelston Waters, Christchurch (NZ)"

Signed and Sealed this

First Day of March, 2005

JON W. DUDAS
*Director of the United States Patent and Trademark Office*